United States Patent [19]

Hamada et al.

[11] Patent Number: 5,100,976
[45] Date of Patent: Mar. 31, 1992

[54] SILICON PRESSURE SENSITIVE ADHESIVE COMPOSITIONS

[75] Inventors: Yuji Hamada; Akihiko Shirahata, both of Chiba, Japan; Thomas J. Tangney, Midland, Mich.

[73] Assignees: Dow Corning Corporation, Midland, Mich.; Dow Corning Toray Silicone Company, Ltd., Tokyo, Japan

[21] Appl. No.: 464,805

[22] Filed: Jan. 16, 1990

[51] Int. Cl.$^5$ ............................................. C08F 283/00
[52] U.S. Cl. ................................. 525/477; 525/478; 525/479; 528/15; 528/31; 528/32; 528/33
[58] Field of Search ............... 525/477, 478, 479; 528/15, 31, 32, 33

[56] References Cited

U.S. PATENT DOCUMENTS

| | | | |
|---|---|---|---|
| 3,284,406 | 11/1968 | Nelson | 525/477 |
| 3,929,704 | 12/1975 | Horning | 525/477 |
| 4,143,088 | 3/1979 | Favre et al. | 525/477 |
| 4,309,520 | 1/1982 | Blizzard | 525/477 |
| 4,535,141 | 8/1985 | Kroupa | 525/478 |
| 4,584,355 | 4/1986 | Blizzard | 525/477 |
| 4,591,622 | 5/1986 | Blizzard | 525/477 |
| 4,631,299 | 12/1986 | Laisney et al. | 525/477 |
| 4,755,577 | 7/1988 | Suzuki | 525/478 |
| 4,800,124 | 1/1989 | Davis et al. | 525/477 |
| 4,845,164 | 7/1989 | Gutek | 525/478 |
| 4,882,398 | 11/1989 | Mbah | 525/478 |
| 4,988,779 | 1/1991 | Medford et al. | 525/479 |

*Primary Examiner*—John C. Bleutge
*Assistant Examiner*—Margaret W. Glass
*Attorney, Agent, or Firm*—George A. Grindahl

[57] ABSTRACT

The subsequent tack and adhesion of a silicone pressure-sensitive adhesive can be improved by incorporating into the adhesive a small amount of an organopolysiloxane resin having a majority of $R_3SiO_{\frac{1}{2}}$ siloxane units and the balance $(R^2O)_aSiO_{(4-a)/2}$, preferably $SiO_{4/2}$, siloxane units. The resulting composition, when brought into contact with a release liner, such a peelable protective sheet or the backside of the next turn in a roll of tape, have better tack and/or adhesion when separated from that liner than an analogous composition which does not contain the resin.

18 Claims, No Drawings

SILICON PRESSURE SENSITIVE ADHESIVE COMPOSITIONS

BACKGROUND OF THE INVENTION

The present invention relates to compositions which provide silicone pressure-sensitive adhesives, herein also denoted as SPSAs. More specifically, the present invention relates to compositions which provide SPSAs which have improved properties subsequent to their removal from a fluorosilicone release liner.

The adhesive aggressiveness of SPSAs is well documented in the silicone art. While aggressive adhesiveness, i.e. tack and/or adhesive strength, of SPSAs has utility it is also a significant problem. Whether the SPSA has the form of, for example, an adhesive layer on a substrate in the form of a roll of tape; an adhesive layer on an article protected with a peelable backing, such as a decorative trim item to be adhered to an automobile or a medical item to be adhered to the skin of a person: or a transfer adhesive layer protected on two surfaces by peelable backings, the SPSA must be separated from an adjacent surface before it can be used for its intended purpose.

Recently, Brown and Stickles, U.S. Pat. No. 4,736,048, disclosed a fluorosilicone release liner which is said to be useful for releasing solvent-cast, heat-cured SPSAs. Patentees provided examples of laminates comprising peroxide-cured SPSAs, which had been solvent-cast and heat-cured in contact with their fluorosilicone liner; however, they did not disclose any examples of a laminate comprising a platinum-cured SPSA.

In copending U.S. patent application Ser. No. 276,178 filed on Nov. 23, 1988 and titled "PRESSURE SENSITIVE ADHESIVE/RELEASE LINER LAMINATE", Tangney disclosed a laminate comprising an addition-curing SPSA and a fluorosilicone release coating. The release force needed to separate the addition-cured SPSA from the fluorosilicone release coating, after it had been cast onto and cured in contact with the release coating, had a stable value of less than 300 grams per inch, while at the same time displaying stable subsequent adhesiveness and stable subsequent tack.

However, while the laminate of the copending application is a highly desirable article it has one shortcoming. It has been noticed that after the SPSA has been separated from its liner its tack, called subsequent tack, and/or its adhesion, called subsequent, are not as high as sometimes desired.

BRIEF SUMMARY OF THE INVENTION

It is an object of the present invention to provide pressure-sensitive adhesives which have improved subsequent tack and/or adhesion. It is a particular object of the present invention to provide an addition-curing SPSA which has better subsequent tack than the analogous addition-curing SPSAs of the art.

These objects, and others which will become apparent upon consideration of this disclosure and appended claims, are obtained by the present invention which, in brief, comprises a composition obtained by adding a limited amount of certain organopolysiloxane resins to a SPSA composition comprising a polydiorganosiloxane, an organopolysiloxane resin and, optionally, a curing agent.

Peroxide-cured SPSA compositions are disclosed in U.S. Pat. Nos. 2,736,721; 2,814,601; 2,857,356; 3,528,940; 3,929,704; 4,309,520; 4,584,355; 4,591,622; Canadian Patent No. 711,756; and British Patent No. 998,232. Platinum-cured SPSAs, also known as addition-cured SPSAs, are disclosed in U.S. Pat. Nos. 3,527,842; 3,983,298; 4,774,297; and Japanese Patent Application No. 283,343/86. It is believed that the present invention is applicable to these SPSAs.

DETAILED DESCRIPTION OF THE INVENTION

The present invention relates to a silicone pressure sensitive adhesive composition comprising (A) 30 to 70 parts by weight of a polydiorganosiloxane having the general formula $R^1R_2SiO(R_2SiO)_n SiR_2R^1$ wherein each R denotes a monovalent hydrocarbon radical, each $R^1$ denotes a radical selected from the group consisting of R radicals and OH radicals and the, subscript n is a number having an average value of greater than zero;

(B) 30 to 70 parts by weight of an organopolysiloxane consisting essentially of $R_3SiO_{\frac{1}{2}}$ siloxane units and $(R^2O)_aSiO_{(4-a)/2}$ siloxane units in a molar ratio of from 0.6:1 to 0.9:1, wherein R is as noted for component (A) above, the methyl radical comprises at least 50 mol percent of all R radicals, $R^2$ denotes H or R, and the subscript a has a value of from 0 to 0.3; the total of (A) and (B) being 100 parts by weight; and (C) 1 to 25 parts by weight of an organopolysiloxane consisting essentially of $R_3SiO_{\frac{1}{2}}$ siloxane units and $(R^2O)_aSiO_{(4-a)/2}$ siloxane units in a molar ratio of from 1:1 to 1.7:1, wherein R, $R^2$ and the subscript a are as noted for component (B) above, and the methyl radical comprises at least 50 mol percent of all R radicals.

Component (A) is a polydiorganosiloxane having the general formula $R^1R_2SiO(R_2SiO)_n SiR_2R^1$. In this formula each R denotes any monovalent hydrocarbon radical, typically having no more than 10 carbon atoms and preferably no more than 6 carbon atoms.

Examples of R include alkyl radicals such as methyl, ethyl, propyl, hexyl and octyl; alkenyl radicals such as vinyl, allyl, propenyl, butenyl and hexenyl; cyclic hydrocarbon radicals such as cyclohexyl and cyclohexenyl; and aryl radicals such as phenyl, 2-phenylethyl, tolyl and benzyl. Methyl, vinyl and phenyl are, in general, preferred R radicals and the methyl radical preferably accounts for at least 50, most preferably 95, mol percent of all R radicals. When heat resistance and/or low temperature flexibility of the SPSA are desired, the phenyl radical and methyl radical will be present together.

$R^1$ can be any R radical or the hydroxyl radical. For example both $R^1$ radicals can be R, such as methyl, vinyl, H phenyl or hydroxyl. Alternatively the $R^1$ radicals can be different, such as methyl and vinyl or methyl and hydroxyl.

No critical restriction is placed on the molecular weight of component (A), or on the value of n in the above formula, as long as no adverse effect accrues with respect to the workability of the pressure-sensitive adhesive composition of the present invention in practical applications.

The value of the subscript n is preferably such that the organopolysiloxane component (A) has a viscosity at 25° C. of from 100 millipascal-seconds (100 centipoise) to 100 kilopascal-seconds (100,000,000 centipoise). The exact value of n needed to provide a viscosity value falling within said limits depends upon the identity of the R radicals; however, for hydroxyl-terminated and/or R-terminated polydimethylsiloxane n will have a value of from about 50 to about 10,000.

It is preferred that the viscosity of component (A) be at least 500,000 cP (centipoise), more preferably at least 1,000,000 cP, and most preferably at least 10,000,000 cP when measured at 25° C. When all R radicals are methyl, or optionally up to about 5% vinyl and/or phenyl and the remainder methyl, the average value of n will range upwards from about 1500, preferably upwards from about 1800 and most preferably upwards from about 3000. For other R radicals the corresponding value of n will depend upon the particular R radicals that are present in the polydiorganosiloxane. In general the so-called silicone gums are preferred here, where the value of n can be as large as 5000 and more.

A preferred polydiorganosiloxane (A) in the compositions of this invention has the formula

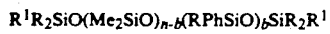

wherein R and $R^1$ have the meanings denoted above, Me denotes the methyl radical, Ph denotes the phenyl radical, n has a value of at least 500, and preferably a value sufficient to provide a viscosity of at least 10,000,000 centipoise at 25° C. and the value of b can range up to the value of n; such as 0, 0.05 n, 0.1 n, 0.5 n and n.

Specific examples of this preferred polydiorganosiloxane include, but are not limited to, $ViMe_2SiO(Me_2SiO)_nSiMe_2Vi$, $ViMe_2SiO(Me_2SiO)_{0.95n}(MePhSiO)_{0.05n}SiMe_2Vi$, $Me_3SiO(Me_2SiO)_nSiMe_3$, $HOMe_2SiO(Me_2SiO)_nSiMe_2OH$, $HOR_2SiO(Me_2SiO)_{0.94n}(Ph_2SiO)_{0.06n}SiR_2OH$, $HOR_2SiO(Me_2SiO)_{0.95n}(MeViSiO)_{0.05n}SiR_2OH$, $ViMe_2SiO(Me_2SiO)_{0.98n}(MeViSiO)_{0.02n}SiMe_2Vi$, $HOR_2SiO(Me_2SiO)_{0.88n}(Ph_2SiO)_{0.12n}SiR_2OH$, $Me_3SiO(Me_2SiO)_{0.9n}(MeViSiO)_{0.1n}SiMe_3$ $PhMeViSiO(Me_2SiO)_nSiPhMeVi$, and $PhMeViSiO(Me_2SiO)_{0.8n}(MePhSiO)_{0.1n}(Ph_2SiO)_{0.1n}SiPhMeVi$, wherein Me, Vi and Ph denote methyl, vinyl and phenyl, respectively.

Typically, a solventless pressure-sensitive adhesive composition can be prepared when n is an integer such that the viscosity of component (A) has a value of from 100 to 100,000 centipoise at 25° C. An organic solvent is typically used when the polydiorganosiloxane has a viscosity of at least one million centipoise, a so-called silicone gum. When the viscosity of component (A) is greater than 100,000 centipoise but less than 1 million centipoise, a suitable quantity of organic solvent may be added, the quantity being dependent on the resin content of the composition.

Polydiorganosiloxanes are well known in the organosilicone art and their syntheses need no extensive delineation herein. Typically, for the synthesis of R-terminated polydiorganosiloxanes, an R-containing terminating reactant, such as divinyltetramethyldisiloxane or hexamethyldisilazane, is equilibrated with a diorganosiloxane reactant, such as octamethylcyclotetrasiloxane, in the presence of an acidic or alkaline catalyst. A phenyl radical-containing and/or a vinyl radical-containing diorganosiloxane reactant can also be included in the reaction mixture to introduce phenyl and/or vinyl radicals into the polymer chain, if desired. Additionally, phenyl radicals can be incorporated into the R-containing terminating reactant, if desired. The molecular weight of the polydiorganosiloxane can be controlled by use of the appropriate amount of terminating reactant, in the well-known manner. Typically, for the synthesis of OH-terminated polydiorganosiloxanes a diorganosiloxane reactant, such as octamethylcyclotetrasiloxane, is equilibrated in the presence of an acidic or alkaline catalyst. A phenyl radical-containing and/or a vinyl radical-containing diorganosiloxane reactant can also be included in the reaction mixture to introduce phenyl and/or vinyl radicals into the polymer chain, if desired. The molecular weight of the OH-terminated polydiorganosiloxane can be controlled by use of the appropriate amount of catalyst, in the well-known manner.

Component (B) is an organopolysiloxane which is constituted of $R_3SiO_{\frac{1}{2}}$ units and $(R^2O)_aSiO_{(4-a)/2}$ units. In this component $R_3SiO_{\frac{1}{2}}$ units are bonded to $(R^2O)_aSiO_{(4-a)/2}$ units, most of which are also bonded to $(R^2O)_aSiO_{(4-a)/2}$ units.

This component typically has up to about 5 percent by weight hydroxyl ($R^2=H$) radicals and hydrocarbonoxy ($R^2=R$) radicals bonded to the $(R^2O)_aSiO_{(4-a)/2}$ units, the actual amount depending upon how the component has been prepared. Correspondingly, the value of the subscript a in the $(R^2O)_aSiO_{(4-a)/2}$ units formula ranges from 0 to about 0.3. The predominant $(R^2O)_aSiO_{(4-a)/2}$ units is, of course, $SiO_{4/2}$.

For compositions of this invention which cure by way of an addition reaction between silicon-bonded hydrogen atoms and silicon-bonded alkenyl radicals it is highly preferred that the silicon-bonded hydroxyl content of the component (B) be less than 1.0 and preferably less than 0.6. The silicon-bonded hydroxyl content of an organopolysiloxane resin can be reduced by well-known chemistries, such as by reacting the SiOH groups with a silylating agent such as trimethylchlorosilane or hexamethylsilazane, or by intercondensing the SiOH groups, under an alkaline catalyst, to form additional resin bonds.

In the above formula for component (B), R can be any of the R radicals denoted above for component (A), including preferred embodiments thereof. At least 50, preferably 95, mol percent of all R radicals are to be methyl. Furthermore, in the present invention, the total R radical complement is to contain no more than 0.5 mol percent, and preferably contains 0 mol percent, alkenyl radicals. $R^2$ can be H or any R radical, preferably alkyl, and typically methyl, ethyl or isopropyl.

The molar ratio of $R_3SiO_{\frac{1}{2}}$ units to $(R^2O)_aSiO_{(4-a)/2}$ units must fall within the range of 0.6:1 to 0.9:1. The tackiness of the SPSA is reduced at below 0.6 $R_3SiO_{\frac{1}{2}}$ units per $(R^2O)_aSiO_{(4-a)/2}$ unit, while the cohesive strength is reduced at above 0.9 $R_3SiO_{\frac{1}{2}}$ units per $(R^2O)_aSiO_{(4-a)/2}$ unit.

Component (C) is similar to component (B) in that it is an organopolysiloxane which is constituted of $R_3SiO_{\frac{1}{2}}$ units and $(R^2O)_aSiO_{(4-a)/2}$ units. However, component (C) is critically different from component (B) at least in that the ratio of $R_3SiO_{\frac{1}{2}}$ units to $(R^2O)_aSiO_{(4-a)/2}$ units therein has a larger value.

The molar ratio of $R_3SiO_{\frac{1}{2}}$ units to $(R^2O)_aSiO_{(4-a)/2}$ units in component (C) must fall within the range of 1:1 to 1.7:1 and preferably has a value of from 1.2/1 to 1.4/1. The tackiness is not improved at below a 1:1 ratio, while the cohesive strength is reduced at above a ratio of 1.7/1.

In component (C) R, $R^2$ and the subscript a are as noted above for component (B), including preferred embodiments thereof.

This component, like component (B), can have up to about 5 percent by weight silicon-bonded hydroxyl ($R^2$=H) radicals and silicion-bonded alkoxy ($R^2$=R) radicals bonded to the $(R^2O)_aSiO_{(4-a)/2}$ units, depending upon how it has been prepared. Correspondingly, the value of the subscript a in the $(R^2O)_aSiO_{(4-a)/2}$ units formula ranges from 0 to about 0.3.

For compositions of this invention which cure by way of an addition reaction between silicon-bonded hydrogen atoms and silicon-bonded alkenyl radicals it is preferred that the silicon-bonded hydroxyl content of the component (B) be less than 1.0 and preferably less than 0.6. The silicon-bonded hydroxyl content of component (C) can be reduced as noted above for component (B).

Methods for synthesizing and characterizing the above organopolysiloxanes (B) and (C) are known. The disclosures of U.S. Pat. Nos. 2,676,182; 3,284,406; 3,527,659 and 4,707,531 are incorporated herein by reference to show the preparation of organopolysiloxanes which are suitable as components (B) and (C) in this invention. Component (B) is preferably prepared by the method of U.S. Pat. No. 2,676,182 and, if desired, further treated as disclosed in U.S. Pat. No. 3,527,659 to reduce its silicon-bonded hydroxyl content. Component (C) is preferably prepared by the method of U.S. Pat. No. 4,707,531.

While the mixture of components (A), (B) and (C) possesses various adhesive properties, depending on the particular amounts and identities of the components, those adhesive properties usually can be further improved by curing, i.e. vulcanizing, the composition. Curing can be accomplished by heating the composition at temperatures of up to 300° C. for a suitable length of time, in the well-known manner practiced with earlier SPSA compositions.

Alternatively, and preferably, the compositions of this invention further contain a curing agent to improve the adhesive properties of the SPSA. This curing agent can be an organic peroxide or an organohydrogenpolysiloxane for alkenyl radical-containing compositions.

Examples of organic peroxides that are typically used to cure SPSAs include benzoyl peroxide, dicumyl peroxide, 2,5-dimethyl-2,5-di(t-butylperoxy)hexane and dichlorobenzoyl peroxide; other well-known peroxides are also suitable. Organic peroxides can be used in amounts typically used in the SPSA art.

Organohydrogenpolysiloxanes having an average of at least 2 silicon-bonded hydrogen atoms in each molecule function as crosslinker component (D) for alkenyl radical-containing component (A). Curing proceeds by the addition reaction of the silicon-bonded hydrogen atoms in this component with the alkenyl radicals in component (A) under the catalytic activity of a platinum group metal-containing catalyst.

Any organohydrogenpolysiloxane, particularly any methylhydrogenpolysiloxane, having an average of at least two, and preferably three or more, silicon-bonded hydrogen atoms per silicon atom can be used as component (D) in the compositions of this invention. The molecular structure of this component is not critical and can be cyclic, linear, branched and/or network, as desired. The organic radicals in the organohydrogenpolysiloxane can be any monovalent hydrocarbon radical free of aliphatic unsaturation, as is well known, such as the general and specific alkyl and aryl radicals denoted above for component (A). For maximum compatibility the organic radicals in the organohydrogenpolysiloxane are the same as those in components (A) to (C) that are free of aliphatic unsaturation.

The preferred organohydrogenpolysiloxane is a linear methylhydrogenpolysiloxane comprised of methylhydrogensiloxane siloxane units and, optionally, dimethylsiloxane units. The terminal siloxane units of this linear siloxane are not critical and can be triorganosiloxane units or diorganohydrogensiloxane units or mixtures thereof, wherein the organic radicals are, for example, methyl.

Examples of preferred organohydrogenpolysiloxane have the formula $Me_3SiO(MeHSiO)_c(Me_2SiO)_dSiMe_3$ wherein c has an average value of at least 3, d has an average value of 0 or more and c+d typically has an average value of up to 100. Examples thereof include compounds having the formula $Me_3SiO(MeHSiO)_c$-$SiMe_3$, wherein c has a value of from 30 to 70; and $Me_3SiO(Me_2SiO)_3(MeHSiO)_5SiMe_3$.

Organohydrogenpolysiloxanes which are suitable for use in the compositions of this invention are well known and need no delineation beyond the disclosure of a general formula. Some are commercially available. The disclosure of U.S. Pat. No. 4,154,714 is incorporated herein by reference to show some further examples of organohydrogenpolysiloxanes which are suitable for use in this invention.

Component (E) is a platinum-containing catalyst, and it promotes the addition reaction of component (A) with component (D). Concrete examples here are chloroplatinic acid, chloroplatinic acid-olefin complexes, chloroplatinic acid-vinylsiloxane complexes, and platinum supported on a microparticulate carrier such as alumina.

A particularly useful platinum-containing catalyst for the SPSA compositions is the chloroplatinic acidvinylsiloxane complex disclosed by Willing in U.S. Pat. No. 3,419,593, hereby incorporated by reference. However, the platinum-containing catalyst can be any of the well-known materials that are effective for catalyzing the hydrosilylation reaction of silicon-bonded hydrogen atoms with silicon-bonded alkenyl radicals.

In addition to components (D) and (E) a curing agent for addition-curing SPSAs can further comprise a reaction inhibitor, component (F), to assist in the processing and handling of the addition-curable SPSA compositions of this invention. Component (F) can be any platinum-catalyst inhibitor that is known in the art.

Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, such as and conjugated ene-ynes, U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185.

Preferred catalyst inhibitors for the compositions of this invention are the ene-ynes, such as 3-methyl-3-pentene-1-yne and 3,5-dimethyl-3-hexene-1-yne; and the acetylenic alcohols, such as 3-methyl-1-butyne-3-ol, 3,5-dimethyl-1-hexyne-3-ol, 3-methyl-1-pentyne-3-ol, and phenylbutynol.

The compositions of this invention typically further comprise an appropriate quantity of an organic solvent to dissolve components (A) through (C) and provide for a lower viscosity, and hence an easier application of the pressure-sensitive adhesive composition to various substrates. Concrete examples of this component are hydrocarbons, such as toluene, xylene, heptane, and mineral spirits; halohydrocarbons, alcohols, esters, ketones and combinations of these solvents. The amount of solvent is not critical; however, only a sufficient amount to facilitate the preparation, handling and applying of the composition is recommended.

Furthermore, the addition of small quantities of supplementary components to the composition of the present invention is permissible. Such supplementary components are, for example, the various antioxidants, pigments, stabilizers, and fillers.

The relative amounts of components (A) and (B) that are present in the compositions of this invention can range from 30 to 70, preferably 40 to 60, and most preferably 45 to 55 parts of each.

For every 100 parts by weight of components (A) plus (B) the amount of component (C) is limited to 1 to 25, preferably 3 to 12, parts by weight.

The quantity of component (D), when used, is to be sufficient to provide 1 to 40, preferably 10 to 20 silicon-bonded hydrogen atoms per alkenyl radical in component (A).

Component (E), when used, is added in a quantity sufficient to give 0.1 to 1,000, preferably 1 to 500 and most preferably 10 to 300 parts by weight of platinum for each one million weight parts of the combined quantity of components (A) through (D). The crosslinking reaction will be unsatisfactory at below 0.1 weight part, and the cohesive strength will thus be reduced, while exceeding 1,000 weight parts is disadvantageous due to the resulting short use time and high cost.

The amount of component (F), when used in the compositions of this invention, is not known to be critical and can be any amount that will retard the above-described catalyzed addition reaction at room temperature while not preventing said reaction at elevated temperature. No specific amount of inhibitor can be suggested to obtain a specified bath life at room temperature for the SPSA composition since the desired amount of any particular inhibitor to be used will depend upon the concentration and type of the platinum group metal-containing catalyst, the nature and amounts of components (A) to (D) and the presence or absence of optional ingredients. While not wishing to limit the present invention by theory we believe that there should be at least one molecule of inhibitor for each platinum group metal atom in the composition, to form a room temperature stable complex therebetween. In the solventless compositions of this invention the amount of inhibitor is typically greater than the amount that is used in a solvent-containing composition and is typically sufficient to provide from 25 to 50 molecules thereof for every platinum group metal atom in the composition.

Thus, while we have generally taught the broad and narrow limits for the components in our compositions the skilled worker can readily determine the optimum level thereof for each system, using routine experimentation.

The compositions of this invention are made by homogeneously mixing components (A), (B) and (C), preferably in the presence of an organic solvent to aid mixing, using suitable mixing means, such as a spatula, a drum roller, a mechanical stirrer, a three-roll mill, a sigma blade mixer, a bread dough mixer, and a two-roll mill. Thereafter, the resulting solution is ready for use.

As noted above, a curing agent is preferably added to the mixture of (A) to (C). It is convenient to add said curing agent to said mixture just before the composition is to be used. In the case of addition-curing SPSAs components (D) and (F) can be added to said mixture at any time and component (E) added just prior to using the composition. Alternatively, component (D) or (F) can be added with component (E).

The compositions of this invention have all the uses that former SPSAs have.

The following examples are disclosed to further teach how to practice the present invention and are to be considered as illustrating, but not limiting, the present invention which is properly delineated by the appended claims. In the examples all parts and percents are by weight, unless stated otherwise. The properties reported in the examples were measured by the following methods.

MEASUREMENT OF VISCOSITY

Viscosities were measured in centipoise at room temperature using a Brookfield rotating disc viscometer and were converted to pascal seconds (Pa.s) by multiplying by 0.001.

MEASUREMENT OF SOLIDS CONTENT

A 2-gram sample of material was heated to 150° C. for 1 hour and the weight of the residue expressed as a percentage of the original sample weight.

MEASUREMENT OF RELEASE

Solutions of SPSAs were cast onto a fluorosilicone release liner with a Bird Bar at a thickness sufficient to provide a dry thickness of 1.5 mils of adhesive and heated at 100° for 3 minutes. A sheet of 2-mil Mylar ® brand polyester film was applied to the cured SPSA and the resulting laminate was pressed with a 2 kg rubber-coated roller. The test laminate was then aged at room temperature for various time intervals and cut into $1 \times 6$ inch strips. The laminate was pulled apart at a rate of 12 inches/minute using a Keil Tester. The values recorded are the average of multiple readings taken during the course of one pull per sample. The Keil Tester is described in TAPPI, vol. 43, No. 8. pages 164A and 165A (August 1960). The readings were taken in units of ounces per inch.

MEASUREMENT OF ADHESION

Solutions of SPSAs were cast onto 2-mil Mylar ® at a thickness sufficient to provide a dry thickness of 1.5 mils of adhesive and heated at 100° for 3 minutes. Adhesion of a cured SPSA was measured by applying the cured adhesive to a clean stainless steel panel using a 2 kg rubber roller and measuring the force required to remove the tape therefrom, using the Keil Tester, noted above.

MEASUREMENT OF SUBSEQUENT ADHESION

Subsequent adhesion (SA) of an adhesive that had been removed from a fluorosilicone release liner was measured by applying the released adhesive to a clean stainless steel panel and measuring the force required to remove the tape therefrom, using the Keil Tester noted above. SA is expressed as a percentage of adhesive strength.

MEASUREMENT OF TACK

Tack was measured on a sample prepared as done for the measurement of adhesion using a POLYKEN® brand probe tack tester (Testing Machines, Inc,; Amityville, NY). The test procedure used a 20 gram weight, a dwell time of 0.5 seconds and a pull speed of 0.5 cm/sec. and is expressed in units of grams/cm² of force.

MEASUREMENT OF SUBSEQUENT TACK

Subsequent tack (ST) was measured as noted above for the measurement of tack, except using a tape that had been hand-peeled from a fluorosilicone release liner. ST is expressed as a percentage of tack.

EXAMPLE 1-3

An addition-curing SPSA control composition not of this invention was prepared by mixing 55 parts of a 60% xylene solution of a methylpolysiloxane composed of $(CH_3)_3SiO_{\frac{1}{2}}$ units and $(HO)_aSiO_{(4-a)/2}$ units in a 0.7:1 molar ratio and having a hydroxyl radical-content of less than 1%; 25 parts of a dimethylvinylsiloxy-terminated polydimethylsiloxane gum having a vinyl radical content of 0.03% and a viscosity of more than 10 kPa.s; 0.4 parts of $Me_3SiO(Me_2SiO)_3(MeHSiO)_5SiMe_3$; 0.06 parts phenylbutynol reaction inhibitor and 57.5 parts xylene, followed by the addition of 0.9% chloroplatinic acid-vinylsiloxane complex, based on the weight of the xylene solution. The SiH/SiVi ratio was 20/1.

Examples 1, 2 and 3 of this invention were prepared by separating three 100 part portions of the above-prepared control composition and adding to each portion 5.17, 10.34 or 15.52 parts, respectively, of a 70% xylene solution of a methylpolysiloxane composed of $(CH_3)_3SiO_{\frac{1}{2}}$ units and $(R^2O)_aSiO_{(4-a)/2}$ units in a 1.2:1 molar ratio and having a hydroxyl radical- and ethoxy radical-content of less than 1%. This component, and its preparation, is disclosed in U.S. Pat. No. 4,707,531.

The resulting compositions were each coated onto separate fluorosilicone release liners, prepared as disclosed by Brown and Stickles in their U.S. Pat. No. 4,736,048, so that a 1.5 mil cured adhesive build was obtained. Cure of the compositions was done at 100° C. for three minutes, followed by lamination with 2 mil Mylar®. Properties of the laminates were measured after 1 day and 1, 2, 4 and 8 weeks aging at room temperature.

According to Table I, the pressure-sensitive adhesive compositions of the present invention were found to have a subsequent tack superior to that of the control composition. Although the compositions of this invention provided SPSAs which had lower tack than the unimproved control composition, they provided SPSAs having subsequent tack which was superior to the subsequent tack of the control composition and, in most instances, superior to the tack of the control.

TABLE I

| Property | Control | Example 1 | Example 2 | Example 3 |
|---|---|---|---|---|
| Solids, % | 58.3 | 60.7 | 63.0 | 66.2 |
| Viscosity, Pa.s | 24.1 | 27.9 | 30.8 | 35.1 |
| Tack, g | 1383 | 1348 | 1288 | 1264 |
| Adhesion, oz/in | 45.4 | 46.9 | 44.1 | 43.9 |
| Release, g/in | | | | |
| 1 Day | 11.9 | 18.1 | 26.9 | 25.0 |
| 1 Week | 17.5 | 10.6 | 11.3 | 40.0 |
| 2 Weeks | 17.5 | 13.8 | 31.9 | 43.1 |
| 4 Weeks | 28.8 | 29.4 | 36.9 | 47.5 |
| 8 Weeks | 25.0 | 16.3 | 25.0 | 48.1 |
| ST, %* | | | | |
| 1 Day | 57.8 | 79.2 | 97.3 | 108.6 |
| 1 Week | 57.8 | 83.5 | 103.4 | 111.9 |
| 2 Weeks | 52.1 | 88.1 | 113.4 | 114.2 |
| 4 Weeks | 55.5 | 85.8 | 109.5 | 113.1 |
| 8 Weeks | 69.3 | 94.5 | 116.2 | 119.6 |
| SA, %* | | | | |
| 1 Day | 110.8 | 105.8 | 112.2 | 98.2 |
| 1 Week | 123.6 | 115.6 | 129.9 | 116.4 |
| 2 Weeks | 117.0 | 112.4 | 112.9 | 111.2 |
| 4 Weeks | 125.3 | 123.9 | 125.9 | 120.5 |
| 8 Weeks | 131.3 | 123.7 | 127.0 | 127.3 |

*ST = Subsequent Tack and SA = Subsequent Adhesion, both expressed as a percentage of the original value.

EXAMPLE 4

The composition of Example 1 was prepared as noted except the organohydrogenpolysiloxane was 0.1 parts of $Me_3SiO(MeHSiO)_{35}SiMe_3$. The properties of the cured SPSA that was obtained from this composition are listed in Table II.

EXAMPLE 5

The composition of Example 4 was prepared as noted except the inhibitor was 0.1 parts of ethynylcyclohexene. The properties of the cured SPSA that was obtained from this composition are listed in Table II.

EXAMPLE 6

The composition of Example 1 was prepared as noted except the inhibitor was 0.1 parts of ethynylcyclohexene. The properties of the cured SPSA that was obtained from this composition are listed in Table II.

EXAMPLE 7

The compositions of Examples 1 and 4 were mixed in equal parts. The properties of the cured SPSA that was obtained from this composition are listed in Table II.

TABLE II

| Property | Example 4 | Example 5 | Example 6 | Example 7 |
|---|---|---|---|---|
| Solids, % | 60.8 | 60.8 | 61.0 | — |
| Viscosity, Pa.s | 27.8 | 27.8 | 27.8 | — |
| Tack, g | 1419 | 1409 | 1424 | 1516 |
| Adhesion, oz/in | 45.9 | 46.4 | 45.6 | 43.4 |
| Release, g/in | | | | |
| 1 Day | 72.5 | 73.8 | 10.0 | 27.5 |
| 1 Week | 71.9 | 76.9 | 21.3 | 50.6 |
| 2 Weeks | 71.9 | 69.4 | 50.8 | 47.3 |
| 4 Weeks | 63.8 | 70.0 | 11.3 | 58.1 |
| 8 Weeks | 60.0 | 62.5 | 10.6 | 37.5 |
| ST, %* | | | | |
| 1 Day | 45.5 | 42.2 | 60.0 | 56.9 |
| 1 Week | 57.1 | 57.8 | 66.2 | 68.0 |
| 2 Weeks | 65.5 | 68.3 | 70.5 | 59.2 |
| 4 Weeks | 62.2 | 48.7 | 87.7 | 61.7 |
| 8 Weeks | 74.5 | 57.3 | 107.0 | 81.9 |
| SA, %* | | | | |
| 1 Day | 92.4 | 91.1 | 88.6 | 97.0 |
| 1 Week | 93.9 | 99.4 | 108.1 | 121.0 |
| 2 Weeks | 106.5 | 106.5 | 111.4 | 108.5 |
| 4 Weeks | 97.2 | 90.5 | 113.6 | 115.4 |
| 8 Weeks | 102.8 | 94.6 | 114.3 | 135.0 |

*ST = Subsequent Tack and SA = Subsequent Adhesion, both expressed as a percentage of the corresponding original value.

EXAMPLES 8 AND 9

An addition-curing SPSA control composition not of this invention was prepared by mixing 170.4 parts of a 60% xylene solution of a methylpolysiloxane composed of $(CH_3)_3SiO_{\frac{1}{2}}$ units and $(HO)_aSiO_{(4-1)/2}$ units in a 0.7:1 molar ratio and having a hydroxyl radical-content of less than 1%; 75 parts of a dimethylvinylsiloxy-terminated polydimethyl-comethylphenylsiloxane gum having 7.5 mol percent phenyl-containing siloxane units, a vinyl radical content of 0.03% and a viscosity of more than 10 kPa.s; 1.2 parts of $Me_3SiO(Me_2SiO)_3$-$(MeHSiO)_5SiMe_3$; 0.18 parts phenylbutynol reaction inhibitor and 52.9 parts xylene, followed by the addition of 0.9% chloroplatinic acid-vinylsiloxane complex, based on the weight of the xylene solution. SiH/SiVi=20/1.

Example 8 of this invention was prepared by separating a 100 part portion of the above-prepared composition and adding 3 parts of the 70% xylene solution of a methylpolysiloxane used in Example 1 and composed of $(CH_3)_3SiO_{\frac{1}{2}}$ units and $SiO_2$ units in a 1.2:1 molar ratio and having a hydroxyl radical- and ethoxy radical-content of less than 1% to the 100 part portion.

Example 9 of this invention was prepared by separating a 100 part portion of the above-prepared composition and adding 4 parts of a 60% xylene solution of a methylpolysiloxane composed of $(CH_3)_3SiO_{\frac{1}{2}}$ units and $SiO_2$ units in a 1.2:1 molar ratio, prepared by the method of U.S. Pat. No. 2,676,182 and having a hydroxyl radical-content of greater than 1% to the 100 part portion.

The three compositions were each coated onto a separate fluorosilicone release liner so that a 1.5 mil cured adhesive build was obtained. Cure of the compositions was done at 100° C. for three minutes, followed by lamination with 2 mil Mylar ®. Properties of the laminates were measured after 1 day and 1, 2, 4 and 8 weeks aging at room temperature. The results are summarized in Table III.

TABLE III

| Property | Control | Example 8 | Example 9 |
|---|---|---|---|
| Solids, % | 58.6 | 61.1 | 61.5 |
| Viscosity, Pa · s | 20.8 | 21.6 | 21.9 |
| Tack, g | 911 | 1140 | 1186 |
| Adhesion, oz/in | 42.8 | 41.8 | 44.3 |
| Release, g/in | | | |
| 1 Day | <5 | 5 | — |
| 1 Week | <5 | <5 | 5.0 |
| 2 Weeks | <5 | 10 | 3.8 |
| 4 Weeks | <5 | 5 | 3.8 |
| 8 Weeks | <5 | 13.8 | 3 |
| ST, %* | | | |
| 1 Day | 88.1 | 92.5 | — |
| 1 Week | 102.6 | 131.1 | 126.2 |
| 2 Weeks | 143.5 | 125.5 | 123.7 |
| 4 Weeks | 145.1 | 129.2 | 132.5 |
| 8 Weeks | 146.4 | 137.5 | 111.4 |
| SA, %* | | | |
| 1 Day | 110.5 | 103.1 | — |
| 1 Week | 115.0 | 132.3 | 147.6 |
| 2 Weeks | 126.4 | 141.4 | 149.0 |
| 4 Weeks | 107.5 | 144.3 | 152.6 |
| 8 Weeks | 130.8 | 155.0 | 121.9 |

*ST = Subsequent Tack and SA = Subsequent Adhesion, both expressed as a percentage of the corresponding original value.

That which is claimed is:

1. A silicone pressure sensitive adhesive composition comprising:
   (A) 30 to 70 parts by weight of a polydiorganosiloxane having the general formula $$R^1R_2SiO(R_2SiO)_nSiR_2R^1$$

wherein each R denotes a monovalent hydrocarbon radical, each $R^1$ denotes an alkenyl radical and the subscript n is a number having an average value of greater zero;
   (B) 30 to 70 parts by weight of an organopolysiloxane consisting essentially of $R_3SiO_{\frac{1}{2}}$ siloxane units and $(R^2O)_aSiO_{(4-a)/2}$ siloxane units in a molar ratio of from 0.6:1 to 0.9:1, wherein R is as noted for component (A), the methyl radical comprises at least 50 mol percent of all R radicals, $R^2$ denotes H or R, and the subscript a has a value of from 0 to 0.3; the total of (A) and (B) being 100 parts by weight;
   (C) 1 to 25 parts by weight of an organopolysiloxane consisting essentially of $R_3SiO_{\frac{1}{2}}$ siloxane units and $(R^2O)_aSiO_{(4-a)/2}$ siloxane units in a molar ratio of from 1:1 to 1.7:1, wherein R, $R^2$ and the subscript a are as noted for component (B) above, the methyl radical comprises at least 50 mol percent of all R radicals, $R^2$ denotes H or R, and the subscript a has a value of from 0 to 0.3; and an effective amount of a curing agent for the composition, said curing agent comprising
   (D) an organohydrogenpolysiloxane having an average of at least 2 silicon-bonded hydrogen atoms in each molecule in an amount sufficient to provide from 1 to 40 silicon-bonded hydrogen atoms per alkenyl radical in component (A),
   (E) a platinum-containing catalyst for the addition reaction of alkenyl radicals with silicon-bonded hydrogen atoms, in an amount sufficient to provide from 0.1 to 1000 parts by weight of platinum for every one million parts by weight of the combined quantity of components (A) through (C), and
   (F) at least one addition-reaction inhibitor in an amount sufficient to retard the curing reaction at room temperature.

2. A silicone pressure-sensitive adhesive composition in accordance with claim 1 wherein components (B) and (C) each have a silicon-bonded hydroxyl content of no more than 1.0 weight percent.

3. A silicone pressure-sensitive adhesive composition in accordance with claim 1 wherein component (C) consists essentially of from 1.2 to 1.4 $R_3SiO_{\frac{1}{2}}$ siloxane units for every $(R^2O)_aSiO_{(4-a)/2}$ siloxane unit in the component.

4. A silicone pressure sensitive adhesive composition in accordance with claim 1 wherein component (A) has the formula $$R^1R_2SiO(Me_2SiO)_{n-b}(RPhSiO)_bSiR_2R^1$$

wherein each $R^1$ denotes Vi; each R denotes, independently, Me or Ph; Me, Ph, and Vi denote the methyl, phenyl and vinyl radical, respectively; the subscript b has a value of from zero to n; and the subscript n is a number having an average value of greater than 500.

5. A silicone pressure sensitive composition in accordance with claim 4 wherein components (B) and (C) consist essentially of $Me_3SiO_{\frac{1}{2}}$ siloxane units and $(R^2O)_aSiO_{(4-a)/2}$ siloxane units.

6. A silicone pressure sensitive composition in accordance with claim 5 wherein the polydiorganosiloxane has the formula $$ViMe_2SiO(Me_2SiO)_nSiMe_2Vi$$

and the organohydrogenpolysiloxane has the formula $$Me_3SiO(MeHSiO)_c(Me_2SiO)_dSiMe_3$$

wherein c has an average value of at least 3 and d has an average value of 0 or more.

7. A silicone pressure sensitive composition in accordance with claim 5 wherein the polydiorganosiloxane has the formula $$ViMe_2SiO(Me_2SiO)_{n-b}(MePhSiO)_bSiMe_2Vi$$

wherein b has a value of from 1 to n, and the organohydrogenpolysiloxane has the formula $$Me_3SiO(MeHSiO)_c(Me_2SiO)_dSiMe_3$$

wherein c has an average value of at least 3 and d has an average value of 0 or more.

8. A silicone pressure sensitive adhesive composition consisting essentially of
(A) 40 to 50 parts by weight of a polydiorganosiloxane having the general formula $$ViMe_2SiO(Me_2SiO)_nSiMe_2Vi$$

wherein Me denotes the methyl radical and Vi denotes the vinyl radical and the subscript n has a value of at least 1,500;
(B) 50 to 60 parts by weight of an organopolysiloxane consisting essentially of $Me_3SiO_{\frac{1}{2}}$ siloxane units and $(R^2O)_aSiO_{(4-a)/2}$ siloxane units in a molar ratio of from 0.6:1 to 0.9:1, wherein $R^2$ denotes H or R, and the subscript a has a value of from 0 to 0.1 and the OH radical comprises no more than 0.6 percent by weight of the organopolysiloxane; the total of (A) and (B) being 100 parts by weight;
(C) 3 to 12 parts by weight of an organopolysiloxane consisting essentially of $Me_3SiO_{\frac{1}{2}}$ siloxane units and $(R^2O)_aSiO_{(4-a)/2}$ siloxane units in a molar ratio of from 1.2:1 to 1.4:1, wherein $R^1$ denotes H or R, and the subscript a has a value of from 0 to 0.1 and the OH radical comprises no more than 0.6 percent by weight of the organopolysiloxane;
(D) 0.1 to 1 part by weight of an organohydrogenpolysiloxane having the formula $$Me_3SiO(MeHSiO)_{35}SiMe_3;$$

(E) a vinylsiloxane complex of chloroplatinic acid in sufficient amount to provide from 100 to 500 parts by weight of platinum per 1 million parts by weight of components (A) to (D);
(F) a catalyst-inhibiting amount of an acetylenic alcohol inhibitor; and
(G) a hydrocarbon solvent in sufficient amount to provide for the composition a viscosity at 25° C. of from 10,000 to 100,000 centipoise.

9. A silicone pressure sensitive adhesive composition consisting essentially of
(A) 40 to 50 parts by weight of a polydiorganosiloxane having the general formula $$ViMe_2SiO(Me_2SiO)_nSiMe_2Vi$$

wherein Me denotes the methyl radical and Vi denotes the vinyl radical and the subscript n has a value of at least 1,500;
(B) 50 to 60 parts by weight of an organopolysiloxane consisting essentially of $Me_3SiO_{\frac{1}{2}}$ siloxane units and $(R^2O)_aSiO_{(4-a)/2}$ siloxane units in a molar ratio of from 0.6:1 to 0.9:1, wherein $R^2$ denotes H or R, and the subscript a has a value of from 0 to 0.1 and the H radical comprises no more than 0.6 percent by weight of the organopolysiloxane; the total of (A) and (B) being 100 parts by weight;
(C) 3 to 12 parts by weight of an organopolysiloxane consisting essentially of $Me_3SiO_{\frac{1}{2}}$ siloxane units and $(R^2O)_aSiO_{(4-a)/2}$ siloxane units in a molar ratio of from 1.2:1 to 1.4:1, wherein $R^2$ denotes H or R, and the subscript a has a value of from 0 to 0.1 and the OH radical comprises no more than 0.6 percent by weight of the organopolysiloxane;
(D) 0.1 to 1 part by weight of an organohydrogenpolysiloxane having the formula $$Me_3SiO(MeHSiO)_5(Me_2SiO)_3SiMe_3;$$

(E) a vinylsiloxane complex of chloroplatinic acid in sufficient amount to provide from 100 to 500 parts by weight of platinum per 1 million parts by weight of components (A) to (D);
(F) a catalyst-inhibiting amount of an acetylenic alcohol inhibitor; and
(G) a hydrocarbon solvent in sufficient amount to provide for the composition a viscosity at 25° C. of from 10,000 to 100,000 centipoise.

10. A silicone pressure-sensitive adhesive composition in accordance with claim 1 further comprising a viscosity-lowering amount of an organic solvent.

11. A silicone pressure-sensitive adhesive composition in accordance with claim 2 further comprising a viscosity-lowering amount of an organic solvent.

12. A silicone pressure-sensitive adhesive composition in accordance with claim 3 further comprising a viscosity-lowering amount of an organic solvent.

13. A silicone pressure-sensitive adhesive composition in accordance with claim 4 further comprising a viscosity-lowering amount of an organic solvent.

14. A silicone pressure-sensitive adhesive composition in accordance with claim 5 further comprising a viscosity-lowering amount of an organic solvent.

15. A silicone pressure-sensitive adhesive composition in accordance with claim 6 further comprising a viscosity-lowering amount of an organic solvent.

16. A silicone pressure-sensitive adhesive composition in accordance with claim 7 further comprising a viscosity-lowering amount of an organic solvent.

17. A silicone pressure-sensitive adhesive composition in accordance with claim 8 further comprising a viscosity-lowering amount of an organic solvent.

18. A silicone pressure-sensitive adhesive composition in accordance with claim 9 further comprising a viscosity-lowering amount of an organic solvent.

* * * * *